Figure 1:
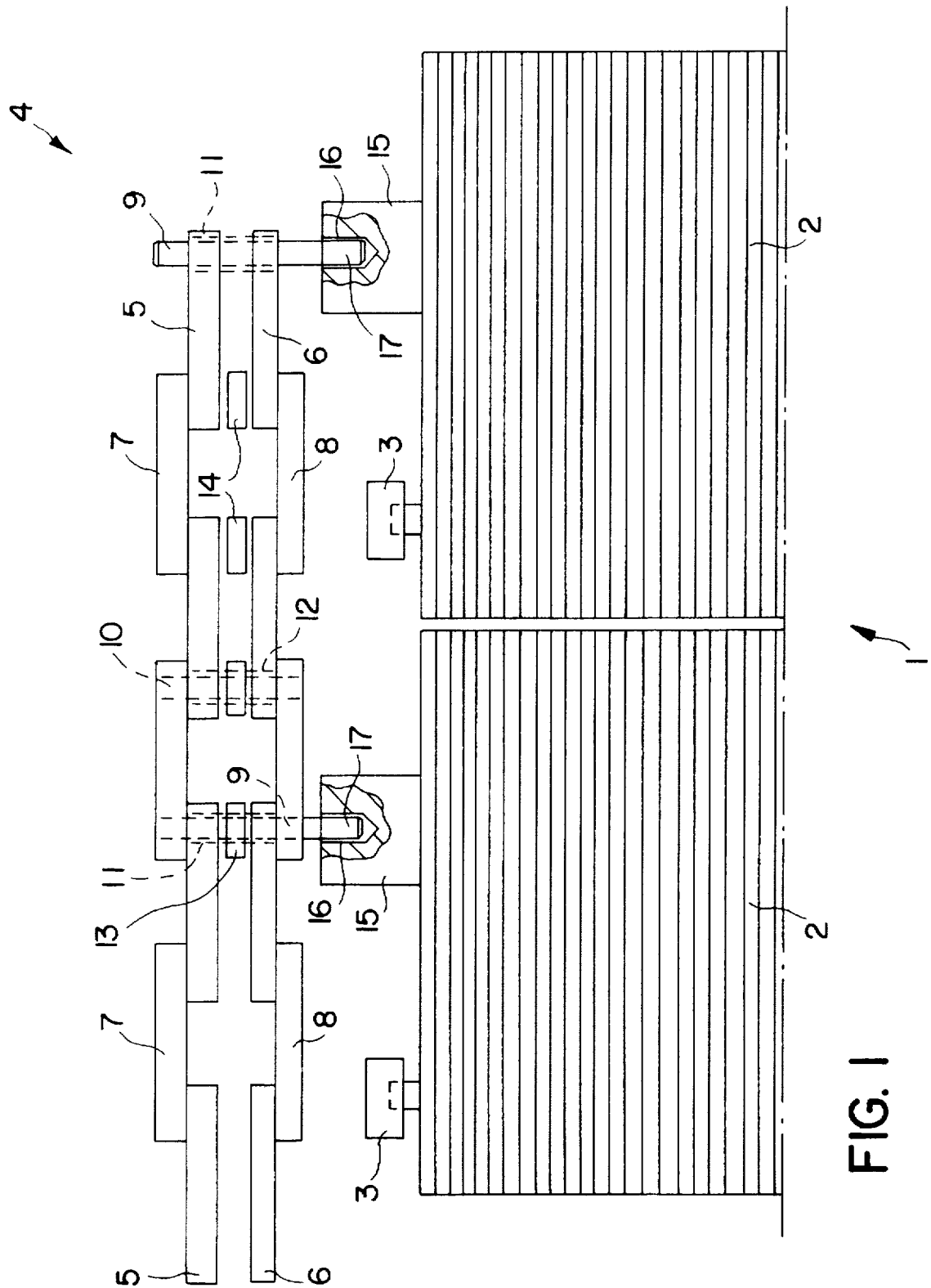

United States Patent [19]

Hoefling et al.

[11] Patent Number: 5,785,166

[45] Date of Patent: Jul. 28, 1998

[54] DRIVE SYSTEM FOR ESCALATORS OR MOVING SIDEWALKS

[75] Inventors: Peter Hoefling, Dortmund; Hermann Wilke, Eslohe; Henrik Hauser, Dortmund, all of Germany

[73] Assignees: O&K Rolltreppen GmbH of Hattingen; Ketten Wulf GmbH Gelenkketten- Und Kettenräderfabrik of Eslohe-Kückelheim, both of Germany

[21] Appl. No.: 637,788

[22] PCT Filed: Sep. 28, 1994

[86] PCT No.: PCT/EP94/03244

§ 371 Date: Apr. 8, 1996

§ 102(e) Date: Apr. 8, 1996

[87] PCT Pub. No.: WO95/09082

PCT Pub. Date: Apr. 13, 1995

[30] Foreign Application Priority Data

Oct. 6, 1993 [DE] Germany .............. 43 34 064.4

[51] Int. Cl.[6] .................................................. B65G 23/02
[52] U.S. Cl. .......................................... 198/330; 198/326
[58] Field of Search ........................... 198/323, 330, 198/832, 850, 851

[56] References Cited

U.S. PATENT DOCUMENTS

| | | | |
|---|---|---|---|
| 2,145,343 | 1/1939 | Dempsey | 198/326 |
| 3,815,959 | 6/1974 | Hill | |
| 4,232,783 | 11/1980 | Kraft | |
| 4,361,220 | 11/1982 | Kraft | 198/330 |
| 5,137,135 | 8/1992 | Pietsch et al. | 198/326 X |
| 5,219,060 | 6/1993 | Diasparra et al. | |

FOREIGN PATENT DOCUMENTS

| | | |
|---|---|---|
| 0094110 | 4/1983 | European Pat. Off. |
| 0490591A2 | 12/1991 | European Pat. Off. |
| 0601469A1 | 1/1993 | European Pat. Off. |
| 8407433 | 5/1984 | France |
| GM 1869061 | 11/1962 | Germany |
| 3808912A1 | 3/1988 | Germany |
| 49-104052 | 10/1974 | Japan |
| 60-242191 | 12/1985 | Japan |
| 1-180478 | 12/1989 | Japan |

OTHER PUBLICATIONS

Konstruktion 18. J. 1966.

Hütte, Taschenbuch der Werkstoffkunde, 4. Aflage, 1967.

Maschinenelemente von Karl–Heinz Decker, 10. Auflage 1990.

Der Aufzugsbau, C.F. Franzen/Th. Englert, 1972.

*Primary Examiner*—James R. Bidwell
*Attorney, Agent, or Firm*—Spencer & Frank

[57] ABSTRACT

A drive system for the steps and carriage pallets of escalators and moving sidewalks. A conveyor chain is arranged beside the steps or carriage pallets, the conveyor chain having a number of link pins of different axial lengths cooperating with bushes. The link pins are axially longer and respectively fitted with a running roller provided in the region of the steps or carriage pallets and are connected with these, if desired, via further components. Also provided are a plurality of plates cooperating, also by way of running rollers if desired, with the axially shorter link pins and bushes. The plates are connected in a manner fixed against relative rotation as inner plates to the bushes and as outer plates to the link pins. Sealing elements are provided in the region of both faces of the bushes. The link pins are formed by electroplated, case-hardened steel pins and the bushes are made of a case-hardened quenched and tempered steel and electroplated between the link pins. At least one sliding bearing which is formed of a thin-walled plastic extends between the link pins and the bushes.

40 Claims, 5 Drawing Sheets

DRIVE SYSTEM FOR ESCALATORS OR MOVING SIDEWALKS

The invention relates to a drive system for the steps and carriage pallets of escalators and moving sidewalks, comprising respectively a conveyor chain arranged beside the steps or carriage pallets, with the conveyor chain including a plurality of link pins of different axial lengths cooperating with bushes, wherein the link pins which are axially longer and respectively fitted with a running roller are provided in the region of the steps or carriage pallets and are connected with these, if desired, via further components, further including a plurality of plates cooperating also by way of running rollers, if desired, with the axially shorter link pins and bushes, which plates are connected in a manner fixed against relative rotation as inner plates to the bushes and as outer plates to the link pins, wherein sealing elements are provided in the region of both faces of the bushes.

EP-A 94 110 relates to a conveyor chain, particularly for moving staircases or people movers, which includes link pins having at least one lubricating surface, with the link pins supporting two outer plates and bushes arranged in-between the outer plates, wherein a running wheel is arranged on each of the bushes and one inner plate each on both sides of the running wheel. On both sides of the lubricating surfaces and within the bushes, a circumferential groove provided with a sealing ring is arranged on each link pin and respectively one sealing washer is arranged between the bush ends and the oppositely disposed outer plate. The sealing ring is embodied as rubber O-ring, while the sealing washer is comprised of a wear-free material. The lubricating surface of the link pins has at least one hole which is perpendicular to the lubricating surface and arranged in the axis of the link pin. By way of this prior art, a conveyor chain is to be formed which is suitable for use in a humid atmosphere and where soiling occurs and which does not require relubrication for the joints. But since here a bush chain of conventional design is employed and relubrication facilities also are and must be provided, this can merely be referred to as a less maintenance-intensive conveyor chain, especially since only measures were taken which are designed to limit the unavoidable leakage of lubricant to the outside and to reduce the passage of dirt from the outside to the inside. With regard to the still constant friction between the seals and the corresponding components, it cannot be excluded that, over the service life of the conveyor chain, wear will lead to a further undesirable lubricant leakage, which ultimately will again lead to undesirable soiling of not only the chain but also of the other components of the escalators or moving sidewalks. A further drawback that must be mentioned is that the use of conventional steel components for the link pins and the bushes surrounding them generates considerable running noise which becomes particularly noticeable if the chain is insufficiently lubricated.

It is the object of the invention to modify a drive system as it is described in the generic part of the first patent claim in the sense that the individual components of the drive system are configured to be maintenance-free to the greatest possible extent, thus increasing the safety of escalators and moving sidewalks while simultaneously reducing the noise pollution.

This object is accomplished by the combination of the following features:

the link pins are formed by electroplated, case-hardened steel pins, the bushes are comprised of a case-hardened quenched and tempered steel and are electroplated, between the link pins and the bushes extends at least one sliding bearing which is formed of a thin-walled plastic bush of homogeneous design and is comprised of thermoplastic materials.

Advantageous modifications of the subject matter of the invention can be taken from the dependent claims.

A maintenance-free drive system is formed which complies with environmental demands and simultaneously contributes to a considerable noise reduction by using the listed mating of materials, namely for the link pins with a nickel coating applied without external current with embedded solid lubricants, if desired, made of PTFE, graphite or the like, in combination with a bush which is also nickel-coated without external current and which in the coating may also include, if desired, solid lubricants made of PTFE, graphite or the like, and by inserting a sliding bearing which is comprised, if desired, of multiple parts and is made of a thermoplastic, possibly fiber-reinforced material which, depending on the application, may also comprise embedded solid lubricant portions.

Depending on the application, it may be advantageous to apply an initial lubricant between the link pin and the sliding bearing, preferably a grease which is applied on the link pin as a thin film prior to assembly.

In contrast to the steel pins and steel bushes employed in the prior art, which inevitably must be lubricated, the subject matter of the invention accomplishes an optimum material combination, especially since a good hardness of the link pins and simultaneously stainlessness of the same is provided, and the reduction of the roughness of the bushes has a favorable impact on the tribological system.

In their structural design, escalators and moving sidewalks used in indoor or outdoor applications differ only slightly, with more stringent requirements existing for outdoor applications than for indoor applications due to atmospheric influences.

Usually, in indoor applications, escalators and moving sidewalks are employed in which running rollers provided with antifriction bearings and disposed in-between the inner plates in the region of the steps or carriage pallets are arranged on the bushes and the lateral sealing takes place by means of disk-shaped sealing elements provided between the inner and outer plates. EP-A 94 110 also includes such a construction. As a modification of this prior art, it is proposed to form the disk-shaped sealing elements from self-lubricating materials such as, for example, from PTFE (polytetrafluoroethylene), especially since these sealing elements do not need any lubrication supplied from the outside. The sealing elements are intended for the axially longer link pins connected to the steps or carriage pallets and with [sic] the axially shorter link pins forming the further joints and disposed in-between the axially longer link pins and, preferably, they are pressed onto the respective link pins between the inner and outer plates. Here, the spacers provided between the inner plates and the inner bearing ring of the running roller form an additional sealing element. The antifriction bearing of the running rollers is preferably provided with lifetime lubrication and sealed against the outside and is surrounded, particularly molded-in, by a polyamide core to achieve a further noise reduction; the polyamide core, in turn, is sheathed by a running surface made from polyurethane. A poly-alpha-olefin base oil lends itself as initial lubricant for escalators and moving sidewalks used in indoor applications.

In the so-called traffic escalators which are used in outdoor applications, running rollers are installed on the associated pins in the region of the steps or of the carriage pallets outside of the outer plates, with the lateral sealing taking place by means of sealing elements provided between the inner and the outer plates. Such conveyor chains are also described in EP-A 94 110. As a modification of this prior art, there are provided between the inner and the outer plates components having an angular cross section and having axial legs oriented toward one another and forming labyrinths, with each axial leg axially straddling a sealing element at least partially which acts in the axial direction and is pressed onto the respective end of the bush. In order to standardize the drive system, the components in combination with the sealing elements, seen in the longitudinal direction of the conveyor chains, are provided in the region of the axially longer as well as the axially shorter link pins and they are pressed onto these link pins. Here, the respective radial legs of the components rest against the associated legs of the outer plates. A grease with a polyglycol base oil lends itself as initial lubricant for escalators and moving sidewalks used in outdoor applications, with the selection of the grease being a function of the respective influences.

Preferably, the sealing element is provided with a sealing lip acting in the axial direction, which lip rests under internal stress, if desired, against the associated radial leg of the component, wherein the components may be comprised either of stainless steel or of plastic. In combination with the component's axial leg forming a labyrinth, the sealing lip ensures that grease from the initial lubrication cannot escape to the outside.

To prevent dirt from entering the region of the sliding bearing from the outside, the sealing element is preferably surrounded by a lubricating grease having a corresponding viscosity, which grease then simultaneously acts as the lubricant for the sealing lip.

As has already been mentioned, in the so-called traffic escalators the running roller is not provided in-between the inner plates but outside of the plates on the pins, with a so-called wear-saving roller then being applied in-between the inner plates on the bushes, which wear-saving roller cooperates with corresponding recesses of a chain starwheel as deflecting element in the respective end region of the escalator or the moving sidewalk. Depending on the lifting height and the associated stresses, the wear-saving roller may be comprised either of a plastic or of steel, with it being possible in the latter case that, between the wear-saving roller and the bush, an additional sliding bearing is provided which includes the same material specification as the sliding bearing between bush and link pin. This additional sliding bearing, in turn, is sealed off against the outside by, if desired, disk-shaped seals which can also be comprised of a self-lubricating material. If necessary, an initial lubrication of the components involved may also take place here.

According to a further concept of the invention, the plates, depending on the application, are also provided with an anticorrosive which, so far, has not been needed in the conventional conveyor chains because these were constantly lubricated anyway. For escalators and moving sidewalks employed in indoor applications, the plates are preferably electrogalvanized or provided with a paint-like anticorrosive, while the plates of escalators or moving sidewalks employed in outdoor applications are rustproofed, e. g., hot-galvanized.

In addition, the axially longer link pins fitted with the running rollers are rotatably seated in axle stubs of the associated steps or carriage pallets, each axle stub being provided with a longitudinal bore, with the bearing also being formed by an initially lubricated sliding bearing. Here, it also appears to be advisable to use a sliding bearing which has the same material specification as the previously described sliding bearings.

Depending on the application, the sliding bearing may have a radially circumferential sealing region outside of the bore, which sealing region extends radially between the free end of the axle stub and the associated outer plate, or, if used in an outdoor application, the sliding bearing may be sealed against the outside by way of an annular element which is made of a self-lubricating material and arranged at the free end of the axle stub.

By way of the proposed combination of characteristics, a novel drive system is designed, which differs considerably from the art of record in terms of low-maintenance or maintenance-free characteristics and which, compared to conventional drive systems, has a greater service life, wherein relubricating facilities usually are required only for drive systems employed in outdoor applications so that, at intervals of three to five years or longer, a corresponding relubrication can take place. But since these time intervals are very long, this drive system can be referred to as a practically maintenance-free system, analogously to the escalators and moving sidewalks employed in indoor applications.

Figure 2:
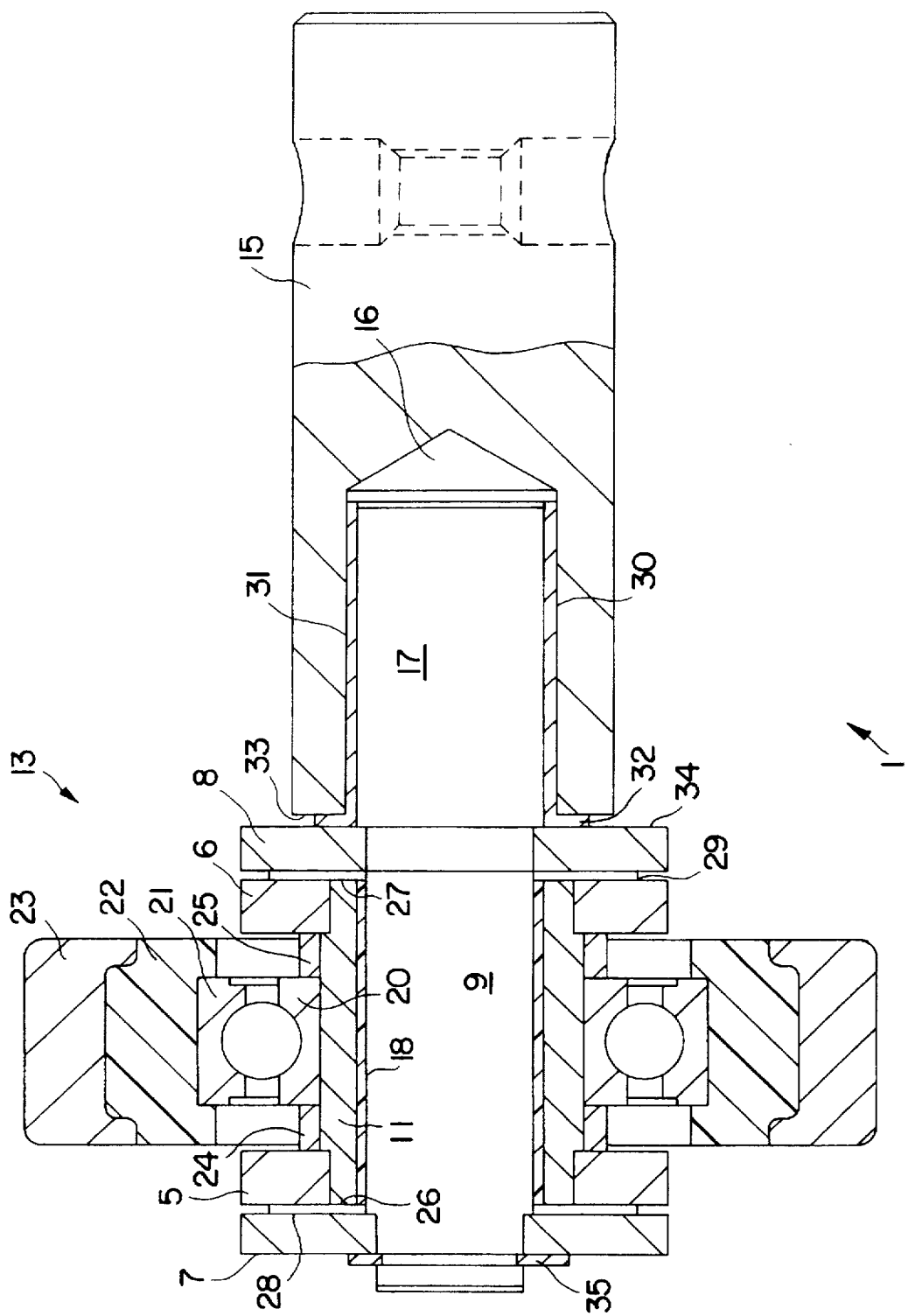
Figure 3:
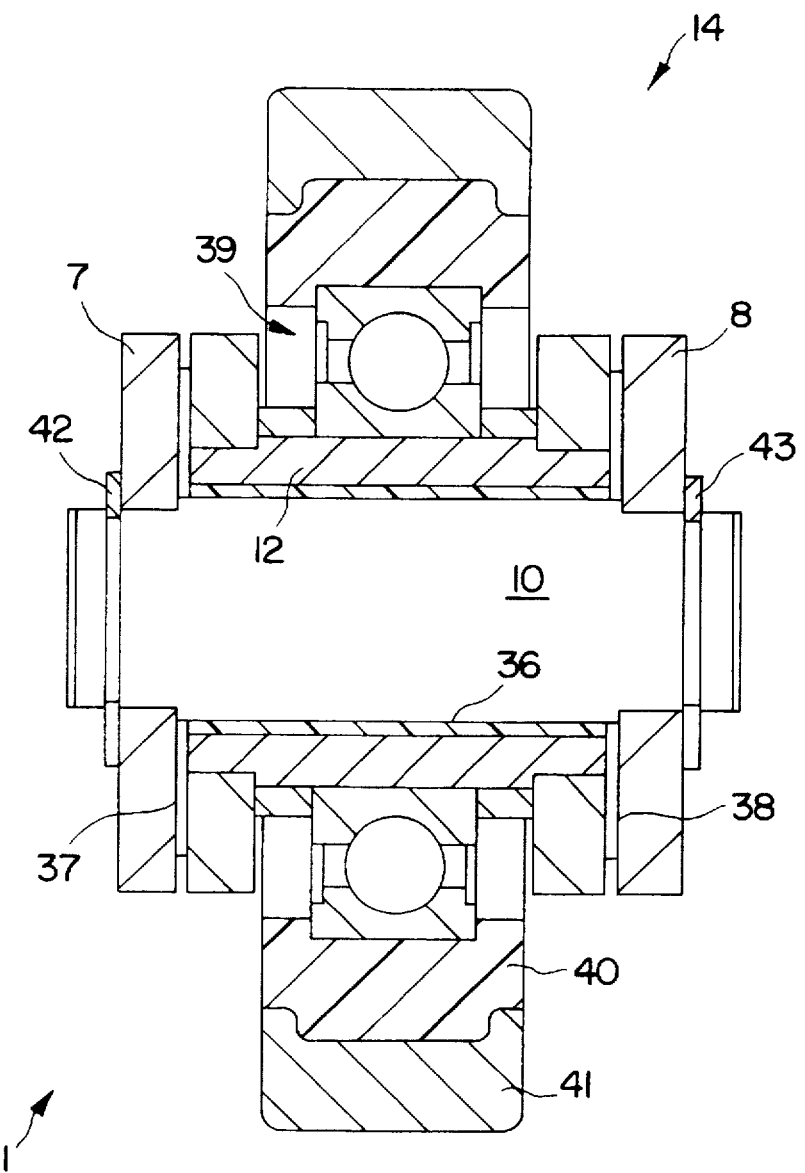
Figure 4:
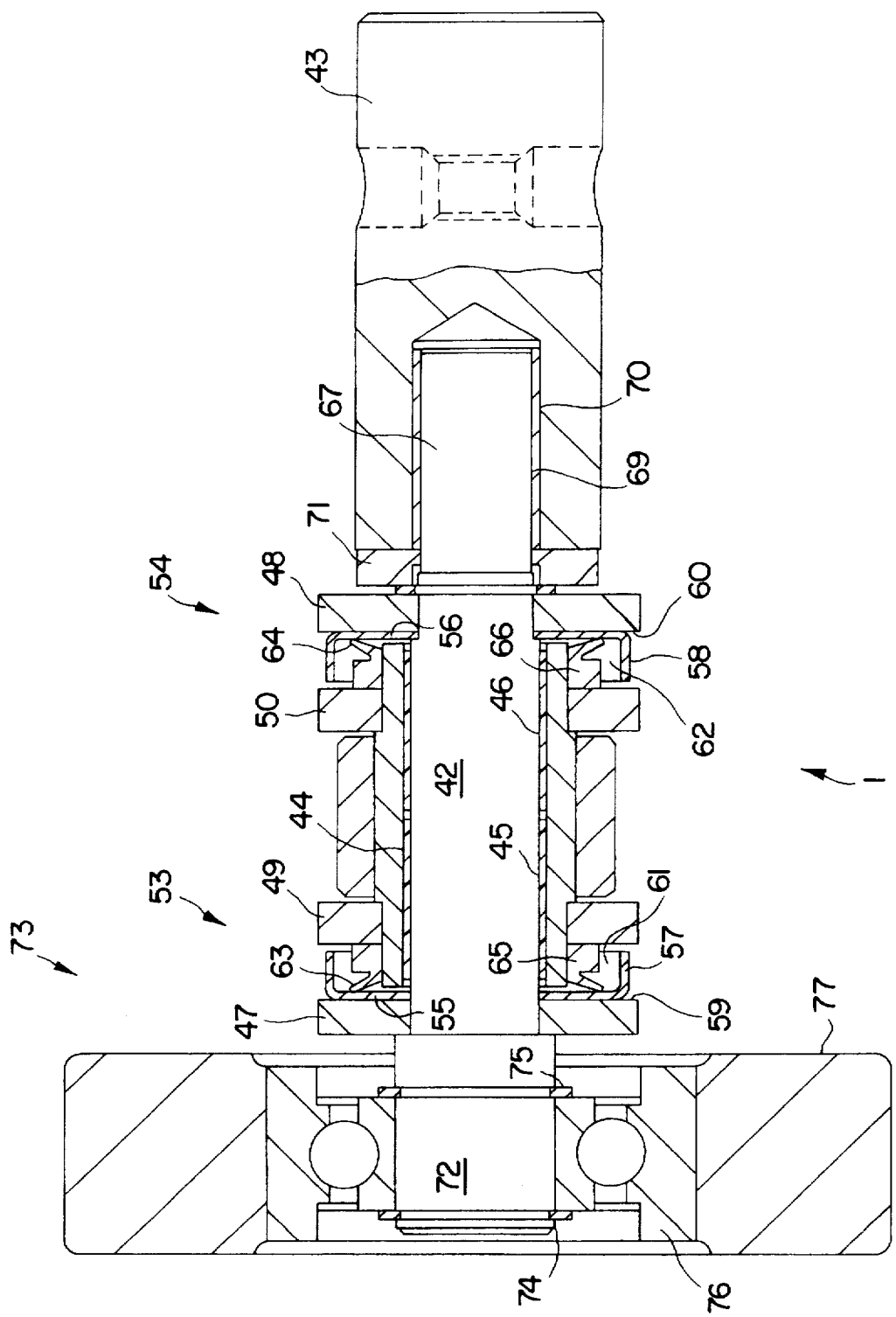
Figure 5:
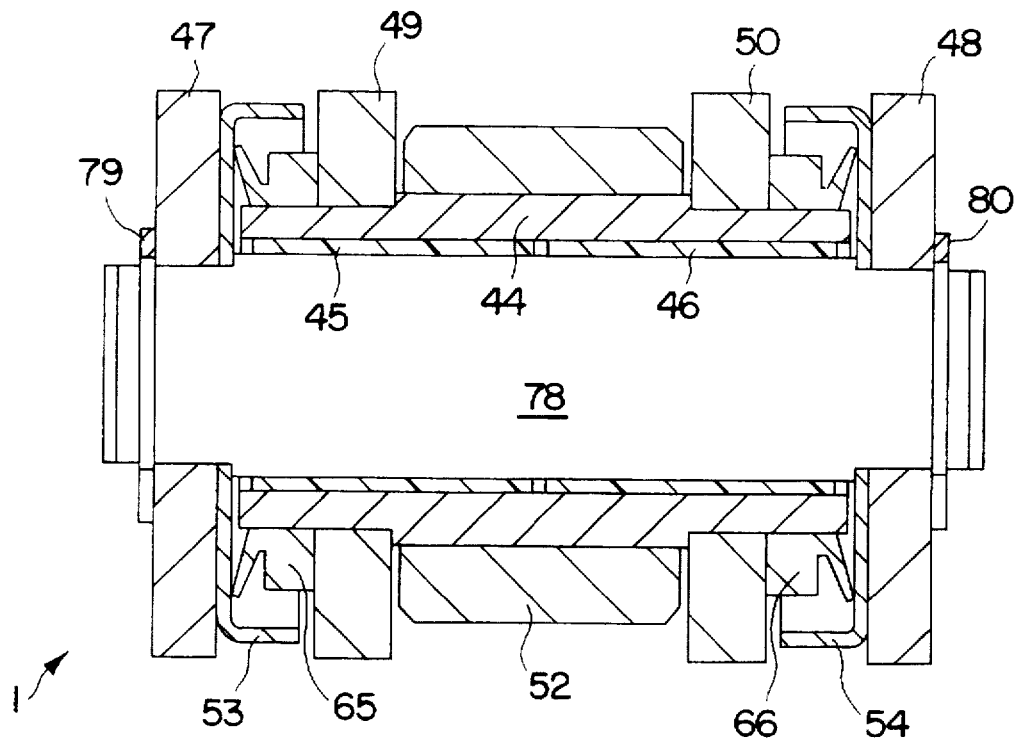
Figure 6:
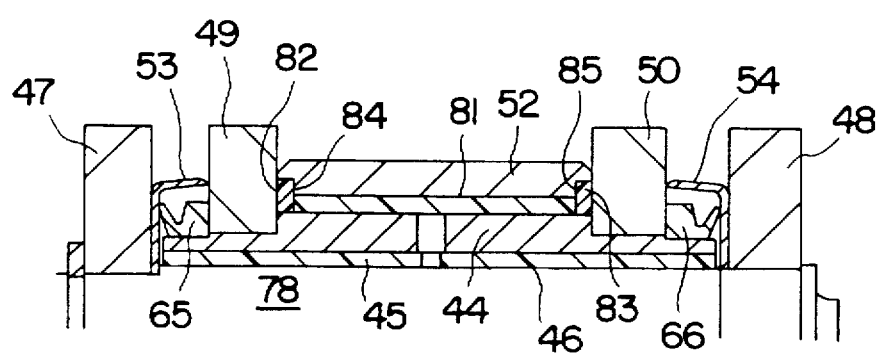

The drive system according to the invention is represented in the drawing by way of an embodiment and described as follows. Shown are:

FIG. 1—partial representation of a drive system for a moving sidewalk,

FIG. 2—cross section through an axially longer link pin including conveyor chain and running roller for a department store escalator, FIG. 3—cross section through an axially shorter link pin as a further joint of the conveyor chain according to FIG. 2, FIG. 4—cross section through an axially longer link pin including conveyor chain and running roller for a traffic escalator, FIG. 5—cross section through an axially shorter link pin as a further joint of the conveyor chain according to FIG. 4, FIG. 6—cross section through a chain link with a further sliding bearing between bush and wear-saving roller according to FIG. 5.

As a schematic diagram, FIG. 1 shows a drive system 1 for a moving sidewalk comprising the following components: Carriage pallets 2 with associated running rollers 3 rolling off onto rail sections, not shown in detail, and a conveyor chain 4 composed of inner plates 5, 6 and outer plates 7, 8, with the inner plates 5, 6 being connected to the outer plates 7, 8, on the one hand, via axially longer link pins 9 and, on the other hand, via axially shorter link pins 10 with one another. The axially shorter link pins 10 as well as the axially longer link pins 9 are surrounded by bushes 11, 12 which are only hinted at here and which are provided in-between the outer plates 7, 8. Here, running rollers 13, 14 are arranged on the bushes 11, 12, with the running rollers being guided in-between the inner plates 5, 6 and also rolling off onto rail sections, also not shown in detail. The conveyor chain 4, which is only shown on one side here, can be deflected in the end regions of the moving sidewalk together with the carriage pallets 2 by means of chain wheels, not shown. In the region of the axially longer link pins 9, the carriage pallets 2 are provided with axial stubs 15 in which longitudinal bores 16 are applied serving to receive the end regions 17 of the axially longer link pins 11. The structural design of the drive system 1, which is only hinted at here, is explained in greater detail in the Figures that follow.

FIG. 2 shows a cross section of a portion of the drive system 1. Recognizable is the axle stub 15 of the carriage pallets, not shown here in detail, which stub receives the end region 17 of the axially longer link pin 9. The drive system 1 described here can be used, for example, for an indoor department store escalator. The link pin 9 is formed by a case-hardened steel pin, for example, of the alloy 23 CrMoB 33 E, provided with a nickel coating as wear protection by means of a galvanic process without external current. The link pin 9 is surrounded by the bush 11 comprised of a case-hardened quenched and tempered steel, for example, of the C15E alloy, which bush is also covered with a nickel coating by means of a galvanic process without external current. Depending on the application, the pin coating as well as the bush coating may comprise solid lubricant portions, for example, consisting of PTFE. Radially between the bush 11 and the link pin 9, a sliding bearing 18 is arranged which is comprised of a thin-walled, fiber-reinforced plastic bush of homogeneous design with embedded solid lubricant portions. Long-fiber matrix glass fibers may be used, for example, as fibers, with the bush itself being comprised of a thermoplastic mixture. As initial lubrication, the link pin 9 is provided with a lubricating film before the sliding bearing 18 is pressed on, with the lubricating film comprising a grease consisting of a poly-alpha-olefin base oil. Furthermore, the drive system 1 is provided with the outer plates 7, 8 pressed onto the link pin 9, the inner plates 5, 6 pressed onto the bushes 11, and the running roller 13 including an antifriction bearing 19 whose inner bearing ring 20 is pressed onto the associated bush 11. Here, the outer bearing ring 21 is molded-in by a polyamide core 22 which, in turn, is sheathed by a running surface 23 made of polyurethane. Between the inner plates 5, 6 and the inner bearing ring 20 extend spacers 24, 25 also forming a sealing point next to the axial fixation of the bearing 19. In the region of both end surfaces 26, 27 of the bushes 11, one sealing washer 28, 29 made of PTFE each is disposed between the inner and outer plates 5, 7 and 6, 8, respectively. As was already indicated, the free end 17 of the axially longer link pin 9 is rotatably seated in the bore 16 of the axle stub 15, with a sliding bearing 31 being arranged here, as well, between the free end 17 of the link pin 9 guided in the bore 16 and the associated circumferential surface 30 of the bore 16, which sliding bearing preferably has the same material specification as the sliding bearing 18. Here, the link pin 9 was also provided with a light lubricating film in the region of its end 17 before the pin is pressed into the sliding bearing 31. The sliding bearing 31 is provided with a radial attachment 32 extending between the end surface 33 of the axle stub 15 and the end surface 34 of the respective outer plate 8, thus assuming a guiding as well as a sealing function at the same time. Toward the outside, the outer plates 7 are secured against sliding off of the link pin 9 by means of a snap ring 35.

FIG. 3 shows the portion of the drive system 1 provided between the axially longer link pins 9 according to FIG. 2, not shown here in detail, namely the axially shorter link pins 10 in combination with the associated bushes 12 and the running rollers 14. This region is configured analogously to the axially longer link pin 9, with identical materials being used as well. Recognizable are the sliding bearing 36 as well as the sealing washers 37, 38. Analogously to running roller 13, running roller 14 comprises an antifriction bearing 39 provided with a polyamide core 40 and a polyurethane running band 41. Since an axial extension of the link pin 10 is not provided, the two outer plates 7, 8 are secured against sliding off of the link pin 10 by means of snap rings 42, 43.

As a partial view of a drive system 1, FIG. 4 shows an axially longer link pin 42 in operative connection with the axle stub 43 of a step, not shown in detail, of a traffic escalator intended for outdoor use. Here, as well, the link pin 42 is made of a case-hardened steel of the alloy 23 CrMoB 33 E provided with a wear protection in the form of a galvanically applied chemical nickel layer. The link pin 42 is surrounded by a bush 44 made of a case-hardened quenched and tempered steel of the specification C15E, with two spaced sliding bearings 45, 46 being arranged axially one behind the other disposed between the link pin 42 and the bush 44. The sliding bearings 45, 46, which are embodied to be thin-walled, are comprised of a thermoplastic mixture including a long-fiber matrix with embedded solid lubricant portions. Prior to assembly, these link pins 42 are also provided with a lubricating film which, as was described above, includes polyglycol as base oil. Outer plates 47, 48 are pressed onto the link pin 42, while the inner plates 49, 50 are pressed onto the bush 44. In-between the inner plates 49, 50, a so-called wear-saving roller 52 is applied on the outer circumferential surface 51 of the bush 44, which wear-saving roller in this example is intended to be made of plastic. Depending on the lifting height of the escalator and the associated stresses, the wear-saving roller 52 may also be comprised of steel, in which case an additional sliding bearing, not shown here in detail, should then be provided between the wear-saving roller 52 and the bush 44, which sliding bearing includes an identical or similar material specification as the sliding bearings 45 and 46.

Between the outer plates 47, 48 and the inner plates 49, 50, components 53, 54 having a pot-shaped configuration are provided which, when seen in cross section, each have a radial leg 55, 56 and an axial leg 57, 58. Here, the radial legs 55, 56 rest against the end surfaces 59, 60 of the outer plates 47, 48, while the axial legs 57, 58 are oriented toward one another, i. e., in the direction of the inner plates 49, 50. Within the free space 61, 62 thus created, a ring-shaped sealing element 65, 66 having a sealing lip 63, 64 is respectively provided, which sealing element is respectively pressed onto an end region of the bush 44 and which, in turn, is supported against the associated inner plate 49, 50. Here, the sealing lip 63, 64 of the respective sealing element 65, 66 rests under internal stress against the associated radial leg 55, 56 of the component 53, 54. Here, the free end 67 of the link pin 42 is guided in a bore 68 of the axle stub 43, analogously to FIG. 2, with a sliding bearing 69 of identical material specification as in the sliding bearings 45, 46 being provided here as well between the circumferential surface 70 of the bore 68 and the end region 67 of the link pin 42. Here, the sealing element is formed by a self-lubricating bronze ring 71 which is provided at the face side of the axle stub 43 and pressed onto the free end 67 of the link pin 42. Outside of the outer plates 47, the running roller 73 is pressed onto an attachment 72 of the link pin 42 and fixed axially by means of locking rings 74, 75. Here, too, the running roller 73 includes an antifriction bearing 76 provided with a sheathing 77 which can be made of a great variety of materials as a function of the loads of the traffic escalator.

FIG. 5 shows the portion of the drive system 1 outside of the axially longer link pins 42 according to FIG. 4, which link pins are connected to the steps, not shown here in detail. Shown are the link pins 78 which receive the outer plates 47, 48 according to FIG. 4. Analogously to FIG. 4, the inner plates 49, 50 are pressed onto the bushes 44. Also provided are the sliding bearings 45, 46, the wear-saving roller 52, the pot-shaped components 53, 54 as well as the sealing elements 65 and 66. The structural configuration of the link pin 78 is identical to the one according to FIG. 4 with the exception of the fact that the axial extension and the running roller are missing here. In view of these missing components, the outer plates 47, 48 are fixed axially by means of snap rings 79, 80.

FIG. 6 represents a partial view of a cross section through a link pin as shown, for example, in FIG. 5. Recognizable are the components link pin 78, sliding bearing 45, 46, bush 44, wear-saving roller 52, components 53, 54, sealing elements 65 66, outer plates 47, 48, and inner plates 49, 50. In contrast to FIG. 5, a further sliding bearing 81 is provided between the bush 44 and the wear-saving roller 52 which is made of steel in this example, which sliding bearing is sealed off on the face side by means of disk-shaped seals 82, 83 comprised of PTFE. The seals 82, 83 are inserted into grooves 84, 85 of the wear-saving roller 52 and are supported in the region of their free end surface against the associated inner plates 49, 50. Advantageously, the sliding bearing 81 is provided with the same material specification as the other sliding bearings 45, 46, with it being possible that an initial lubrication of the components concerned can take place here as well.

We claim:

1. A drive system for the steps and carriage pallets (2) of escalators and moving sidewalks, comprising respectively a conveyor chain (4) arranged beside the steps or carriage pallets (2), with the conveyor chain including a plurality of link pins (9, 10, 42, 78) of different axial lengths cooperating with bushes (11, 12, 44), wherein the link pins (9, 42) which are axially longer and respectively fitted with a running roller (13, 73) are provided in the region of the steps or carriage pallets (2) and are connected with these, if desired, via further components, further including a plurality of plates (5, 6, 7, 8, 47, 48, 49, 50) cooperating also by way of running rollers (14), if desired, with the axially shorter link pins (10, 78) and bushes (12, 44), which plates are connected in a manner fixed against relative rotation as inner plates (5, 6, 49, 50) to the bushes (11, 12, 44) and as outer plates (7, 8, 47, 48) to the link pins (9, 10, 42, 78), wherein sealing elements (28, 29) are provided in the region of both faces (26, 27) of the bushes (9), characterized by the combination of the following features:

the link pins (9, 10, 42, 78) are formed by electroplated, case-hardened steel pins, the bushes (11, 12, 44) are comprised of a case-hardened quenched and tempered steel and are electroplated, between the link pins (9, 10, 42, 78) and the bushes (11, 12, 44) extends at least one sliding bearing (18, 36, 45, 46) which is formed of a thin-walled plastic bush of homogeneous design and is comprised of thermoplastic materials.

2. Drive system according to claim 1, characterized in that the link pins (9, 10, 42, 78) are provided with a nickel coating.

3. Drive system according to claim 2, characterized in that the coating is applied without external current.

4. Drive system according to claim 2, characterized in that solid lubricants, in particular PTFE, are embedded in the coating.

5. Drive system according to claim 1, characterized in that the bushes (11, 12, 44) are provided with a nickel coating.

6. Drive system according to claim 5, characterized in that the coating is applied without external current.

7. Drive system according to claims 5, characterized in that solid lubricants, in particular PTFE, are embedded in the coating.

8. Drive system according to claim 1, characterized in that the plastic bush forming the sliding bearing (18, 36, 45, 46) is fiber-reinforced.

9. Drive system according to claim 1, characterized in that the sliding bearing (18, 36, 45, 46) comprises embedded solid lubricant portions.

10. Drive system according to claim 1, characterized in that, seen in the axial direction, the sliding bearing (45, 46) is embodied to have two parts.

11. Drive system according to claim 1, characterized in that an initial lubricant is provided at least between the link pins (9, 10, 42, 78) and the sliding bearing (18, 36, 45, 46).

12. Drive system according to claim 11, characterized in that the initial lubricant is a grease.

13. Drive system according to claim 12, characterized in that the grease comprises a poly-alpha-olefin base oil.

14. Drive system according to claim 12, characterized in that the grease comprises a polyglycol base oil.

15. Drive system according to claim 1, wherein running rollers (13) provided with antifriction bearings (19) and disposed in-between the inner plates (5, 6) in the region of the steps or carriage pallets (2), are arranged on the bushes (11) and lateral sealing takes place by means of disk-shaped sealing elements (28, 29) provided between inner plates (5, 6) and outer plates (7, 8), characterized in that the sealing elements (28, 29) are formed of self-lubricating materials.

16. Drive system according to claim 15, characterized in that the sealing elements (28, 29) are formed of PTFE.

17. Drive system according to claim 15, characterized in that, seen in the longitudinal direction of the respective conveyor chain (4), the sealing elements (28, 29) are also pressed onto the respective axially shorter link pin (10) between the inner plates (5, 6) and the outer plates (7, 8) outside of the axially longer link pins (9) fitted with running rollers (13).

18. Drive system according to claim 15, characterized in that the running rollers (13, 14, 73) include antifriction bearings (19, 39, 76) with lifetime lubrication which are sealed against the outside.

19. Drive system according to claim 18, characterized in that the antifriction bearing (19, 39) of the running rollers (13, 14) is surrounded, in particular molded-in, by a polyamide core (22, 40) which, in turn, is sheathed by a running surface (23, 41) made from polyurethane.

20. Drive system according to claim 15, characterized in that spacers (24, 25) forming a further sealing point are provided between the inner plates (5, 6) and an inner bearing ring (20).

21. Drive system according to claim 1, wherein in the region of the steps or of the carriage pallets (2) outside of the outer plates (47) running rollers (73) are provided on the associated link pins (42) and lateral sealing takes place by means of sealing elements (65, 66) provided between the inner plates (49, 50) and the outer plates (47, 48), characterized in that, between the inner plates (49, 50) and the outer plates (47, 48), components (53, 54) having an angular cross section and having axial legs (57, 58) oriented toward one another are provided, with each axial leg axially straddling a sealing element (65, 66) at least partially which acts in the axial direction and is pressed onto the respective end of the bush and forms a labyrinth.

22. Drive system according to claim 21, characterized in that the respective component (53, 54) is pressed onto the link pin (42, 78) at an axial distance from the end surfaces of the bushes (44) and rests against the associated outer plate (47, 48) with its radial leg (55, 56).

23. Drive system according to claim 21, characterized in that the sealing element (65, 66) is provided with a sealing lip (63, 64) resting under internal stress, if desired, against the radial leg (55, 56) of the component (53, 54).

24. Drive system according to claim 21, characterized in that, seen in the longitudinal direction of the respective conveyor chain (4), the components (53, 54) in combination with the sealing elements (65, 66) are also provided outside of the link pins (42) fitted with running rollers (73) between the inner plates (49, 50) and the outer plates (47, 48) and are pressed onto the associated link pins (42, 78).

25. Drive system according to claim 21, characterized in that the components (53, 54) are comprised of stainless steel.

26. Drive system according to claim 21, characterized in that the components (53, 54) are comprised of plastic.

27. Drive system according to claim 21, characterized in that lubricating grease is placed into a free space (61, 62) between the components (53, 54) and the sealing elements (65, 66).

28. Drive system according to claim 21, characterized in that the respective bush (44) is surrounded by a wear-saving roller (52).

29. Drive system according to claim 28, characterized in that the wear-saving roller (52) is made of a plastic material.

30. Drive system according to claim 28, characterized in that the wear-saving roller (52) is made of steel and is supported via a sliding bearing (81) against the associated bush (44).

31. Drive system according to claim 30, characterized in that, in the region of its two end surfaces, the sliding bearing (81) is sealed against the outside by respectively one seal (82, 83).

32. Drive system according to claim 31, characterized in that the seal (82, 83) is formed by a disk which is inserted into a groove (84, 85) in the region of the respective end surface of the wear-saving roller (52) and is supported with its free end surface against the associated inner plate (49, 50).

33. Drive system according to claim 30, characterized in that the sliding bearing (81) has the same material specification as the sliding bearing (45, 46) used between the link pins (42, 78) and bushes (44).

34. Drive system according to claim 1, characterized in that in indoor applications of the escalators or moving sidewalks, the plates (5, 6, 7, 8) are electrogalvanized or provided with a paint-like anticorrosive.

35. Drive system according to claim 1, characterized in that, in outdoor applications of the escalators or moving sidewalks, the plates (47, 48, 49, 50) are rustproofed, in particular, hot-galvanized.

36. Drive system according to claim 1, characterized in that the axially longer link pins (9, 42) fitted with the running rollers (13, 73) are rotatably seated in axle stubs (15, 43) of the associated steps or carriage pallets (2), with each axle stub being provided with a longitudinal bore (30, 68).

37. Drive system according to claim 36, characterized in that the bearing (31, 69) is formed by an initially lubricated sliding bearing.

38. Drive system according to claim 37, characterized in that the sliding bearing (31, 69) has the same material specification as the sliding bearings (18, 45, 46) disposed between the link pins (9, 42) and bushes (11, 44).

39. Drive system according to claim 37, characterized in that the sliding bearing (31) is provided with a radially circumferential sealing region (32) outside of the bore (30), which sealing region extends radially between the free end (33) of the axle stub (15) and the associated outer plate (8).

40. Drive system according to claim 37, characterized in that the sliding bearing (69) is sealed against the outside by an annular element (71) which is made of a self-lubricating material and arranged at the free end of the axle stub (43).

* * * * *